(12) United States Patent
Sullivan et al.

(10) Patent No.: US 12,103,471 B1
(45) Date of Patent: Oct. 1, 2024

(54) VACUUM-FORMED INSULATED VAN EXPANSION CAPSULES

(71) Applicants: Royce John Sullivan, Temecula, CA (US); Jerry Stanley Sullivan, Temecula, CA (US)

(72) Inventors: Royce John Sullivan, Temecula, CA (US); Jerry Stanley Sullivan, Temecula, CA (US)

(*) Notice: Subject to any disclaimer, the term of this patent is extended or adjusted under 35 U.S.C. 154(b) by 0 days.

(21) Appl. No.: 18/746,196

(22) Filed: Jun. 18, 2024

(51) Int. Cl.
*B60R 13/02* (2006.01)

(52) U.S. Cl.
CPC .. *B60R 13/0237* (2013.01); *B60R 2013/0293* (2013.01)

(58) Field of Classification Search
CPC .......... B60P 3/34; B60P 3/025; B60P 3/0257; B60P 3/39; B60P 3/42; B60P 3/32; B60P 3/38
USPC ..... 296/190.02, 190.08, 26.01, 26.02, 26.12, 296/26.13, 26.14, 26.15, 165, 170, 171, 296/172, 173, 175, 146.7, 193.05; 52/67
See application file for complete search history.

(56) References Cited

U.S. PATENT DOCUMENTS

| | | | | |
|---|---|---|---|---|
| 2,506,870 A | * | 5/1950 | Hairston | B60N 2/34 296/175 |
| 2,782,068 A | * | 2/1957 | Esche | B60N 2/34 5/118 |
| 3,212,812 A | * | 10/1965 | Kurtz | B60P 3/36 52/72 |
| 3,801,149 A | * | 4/1974 | Reimann | B60N 2/6009 296/156 |
| 3,861,572 A | * | 1/1975 | Norris | B60P 3/38 135/153 |
| 4,104,825 A | * | 8/1978 | Hosmer | B60J 7/1642 160/369 |
| 4,930,837 A | * | 6/1990 | Marsh | B60P 3/34 296/26.02 |
| 5,011,216 A | * | 4/1991 | Baughman | B60P 3/38 135/88.13 |

(Continued)

FOREIGN PATENT DOCUMENTS

KR  20230090746 A  *  6/2023

*Primary Examiner* — Amy R Weisberg
*Assistant Examiner* — Veronica M Shull
(74) *Attorney, Agent, or Firm* — QuickPatents; Kevin Prince

(57) ABSTRACT

An extension capsule for vehicles is provided, consisting of an inner and an outer capsule, both vacuum-formed from lightweight, durable materials. The inner capsule is designed to nest within the outer capsule, and when joined, they create an insulated, structurally reinforced unit. This assembly method enhances the strength and durability of the extension capsule without significantly increasing the vehicle's weight. The capsules feature outwardly-extending lips that facilitate secure attachment to the vehicle, effectively expanding the cargo area's lateral dimensions. The inclusion of an insulation layer between the capsules offers thermal regulation, making the space suitable for comfortable occupancy in various weather conditions. The lightweight construction of the capsules ensures ease of installation and contributes to the vehicle's overall fuel efficiency. This invention provides a practical solution for vehicle owners seeking additional insulated cargo space without compromising on vehicle performance.

8 Claims, 5 Drawing Sheets

(56) References Cited

U.S. PATENT DOCUMENTS

| | | | | |
|---|---|---|---|---|
| 6,213,531 | B1* | 4/2001 | Corey | B62D 33/0612 |
| | | | | 296/26.08 |
| 7,322,628 | B2* | 1/2008 | Kunz | A47B 21/0073 |
| | | | | 296/165 |
| 7,614,675 | B2* | 11/2009 | Kunz | B60P 3/34 |
| | | | | 296/26.12 |
| 7,971,918 | B2* | 7/2011 | Oriet | B62D 35/001 |
| | | | | 296/180.2 |
| 8,480,159 | B2* | 7/2013 | Jones | B60P 3/34 |
| | | | | 296/171 |
| 10,974,664 | B2 | 4/2021 | Scheler | |

* cited by examiner

VACUUM-FORMED INSULATED VAN EXPANSION CAPSULES

STATEMENT REGARDING FEDERALLY SPONSORED RESEARCH AND DEVELOPMENT

Not Applicable.

FIELD OF THE INVENTION

This invention relates to vehicles, and more particularly to a cargo area lateral extension capsule.

BACKGROUND

The modification of vehicles to expand cargo areas for sleeping arrangements is a sought-after customization for those using their vehicles for extended travel or as temporary living spaces. Ensuring that occupants do not come into direct contact with the vehicle's side walls is crucial, as such contact can be uncomfortable and may disrupt sleep due to the hard surfaces and temperature fluctuations. Prior art cargo extension capsules typically lack insulation conducive to a comfortable sleeping environment, leading to interior spaces that are too cold or too hot, depending on external weather conditions.

Existing solutions, such as those exemplified by U.S. Pat. No. 10,974,664B2, offer methods for extending the interior width of a vehicle, particularly in the rear quarter panel area of vans. However, these solutions do not provide for thermal insulation, resulting in a significant drawback as the extended areas remain vulnerable to external temperature variations, rendering them less suitable for comfortable sleeping.

Furthermore, the construction of cargo extension capsules has historically faced material and structural challenges. Prior designs often relied on a single outer shell, which proved too flimsy and lacked the necessary durability for vehicle use. The materials traditionally used, such as ¼ inch fiberglass, also posed problems due to their substantial weight. Such heavy construction materials have negative implications for vehicle performance, impacting safety, braking ability, and fuel economy-factors that are especially critical in Class B RVs and similar vehicles where weight is a key consideration for operational safety and efficiency.

In summary, the prior art in vehicle cargo area expansion has been limited by a lack of suitable insulation options and by the use of materials and designs that do not adequately address the structural integrity and weight concerns necessary for safe and efficient vehicle modification. The needed invention would address the drawbacks of the prior art by ensuring that the extended cargo space is both functional as a living area and conducive to a restful sleeping environment. The present invention accomplishes these objectives.

SUMMARY OF THE INVENTION

The present invention pertains to an extension capsule designed for use with a vehicle to expand its inside cargo area. The extension capsule comprises two main components: an outer capsule and an inner capsule. Both capsules are designed with back wall panels and peripheral walls that project forward, terminating in outwardly-extending lips. The inner capsule is configured to nest within the outer capsule, creating gaps between the peripheral walls and back walls of the two capsules.

The outwardly-extending lips of both the outer and inner capsules are designed to contact the outer and inner surfaces, respectively, of the vehicle's side wall at an extension aperture. This configuration allows the extension capsule to be securely attached to the vehicle, thereby extending the cargo area outwardly into the capsule.

An optional feature of the invention is the inclusion of an insulation layer between the inner and outer capsules. This layer provides thermal insulation, which can be particularly beneficial for maintaining temperature-sensitive cargo.

Another optional aspect of the invention involves the incorporation of window apertures in both the inner and outer capsules, with a transparent window fixed within at least the outer capsule. This window can include both a fixed pane and a selectively openable pane, allowing for visibility into the cargo area and the option to open the window for ventilation or to accommodate larger items.

The extension capsule is designed to be versatile and adaptable, with optional features that can be included as needed to suit various requirements. The invention provides a practical solution for vehicle owners who need additional cargo space, while also offering the potential for customization through the inclusion of insulation, windows, and other features. The design is focused on ease of use, security, structural integrity, and the ability to maintain the functionality of the vehicle while expanding its cargo-carrying capabilities.

Recognizing the limitations of the prior art, the present invention emerges as a superior solution that adeptly addresses these deficiencies. This innovative extension capsule not only enlarges the cargo area of a vehicle but also thoughtfully incorporates an insulating layer, ensuring a thermally regulated environment conducive to comfortable sleeping conditions. The design of this invention allows for a sleeper to rest within the vehicle without the discomfort of contacting the side walls, thereby enhancing the overall utility of the space for habitation purposes.

In addition to providing a comfortable and functional living space, the present invention also introduces a significant advancement in the form of a structurally robust yet lightweight material for the construction of the extension capsule. This material choice results in a product that is easier to handle and install, and that contributes to the overall safety and fuel efficiency of the vehicle by reducing the added weight of the modification. The combination of these features—ease of installation, maintenance, structural strength, and reduced weight—makes the present invention a comprehensive and innovative solution for vehicle modification. Further details and advantages of the present invention will be apparent from the more detailed description that follows, which should be considered in conjunction with the accompanying drawings that illustrate the principles of the invention by example.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
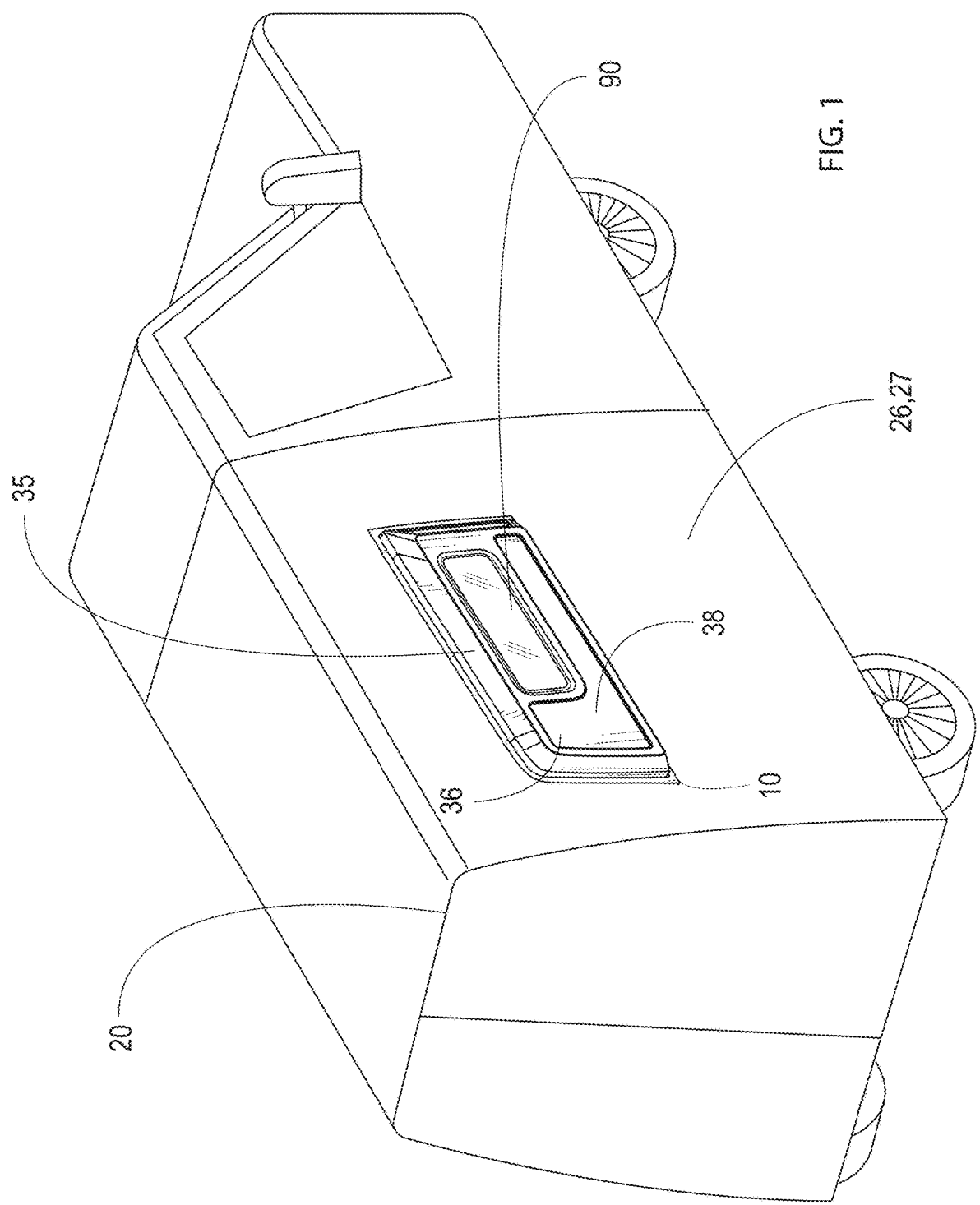
FIG. 1 is a perspective view of the invention, illustrating an outside of a vehicle and an outer capsule of the invention.
Figure 2:
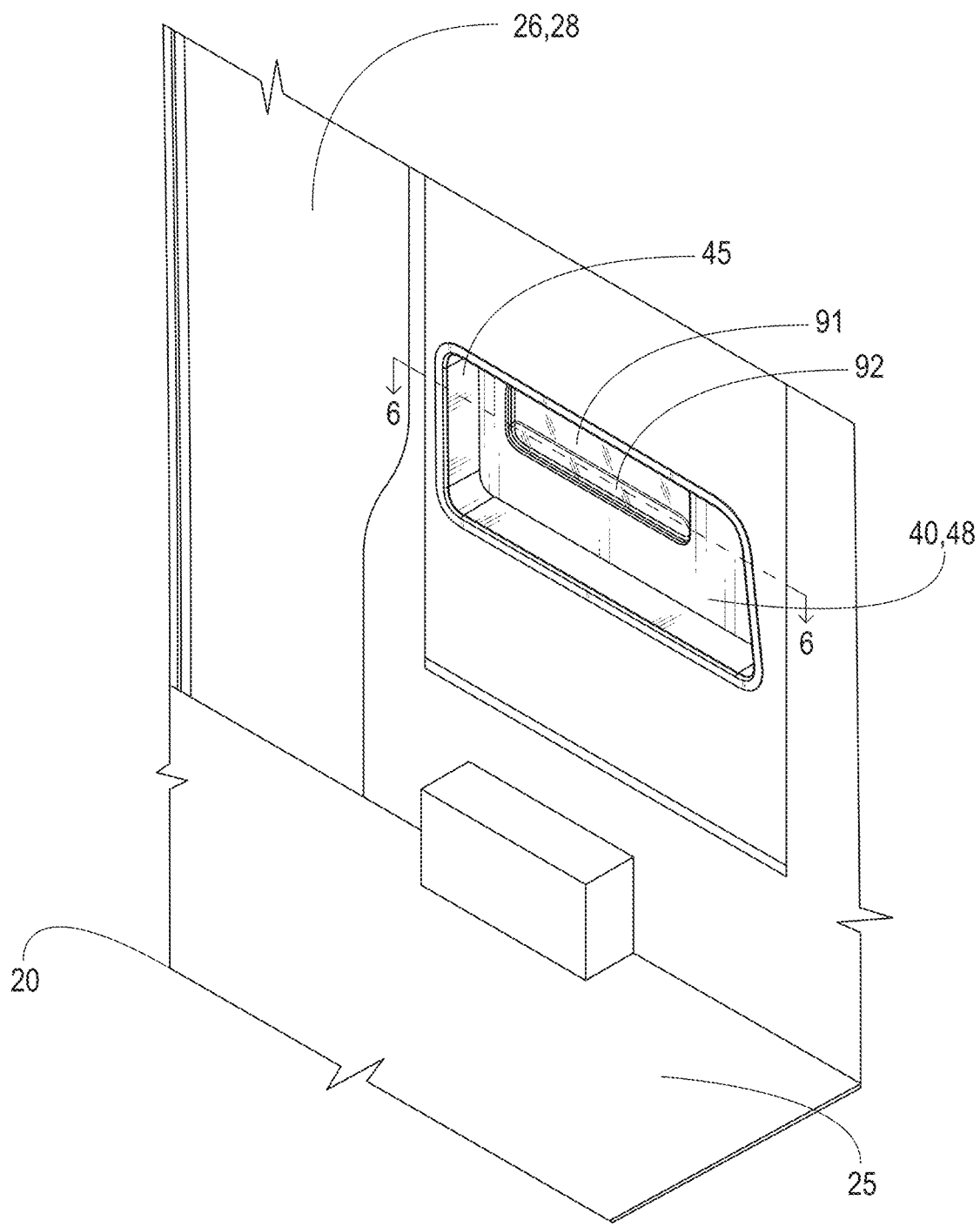
FIG. 2 is a perspective view of the invention, illustrating an inside of the vehicle and an inner capsule of the invention nested with the outer capsule.
Figure 3:
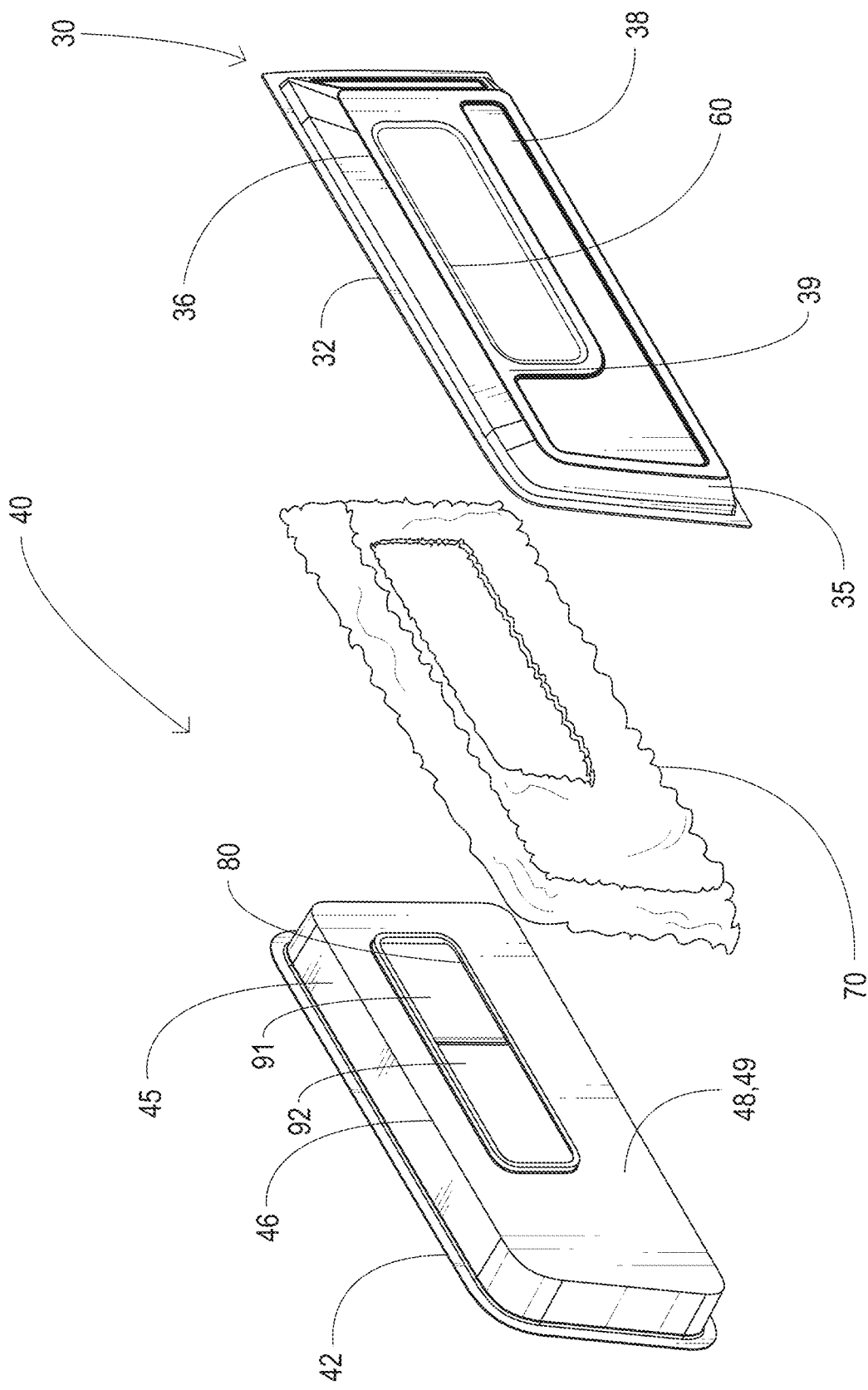
FIG. 3 is an exploded perspective view showing outer surfaces of the inner capsule and the outer capsule.
Figure 4:
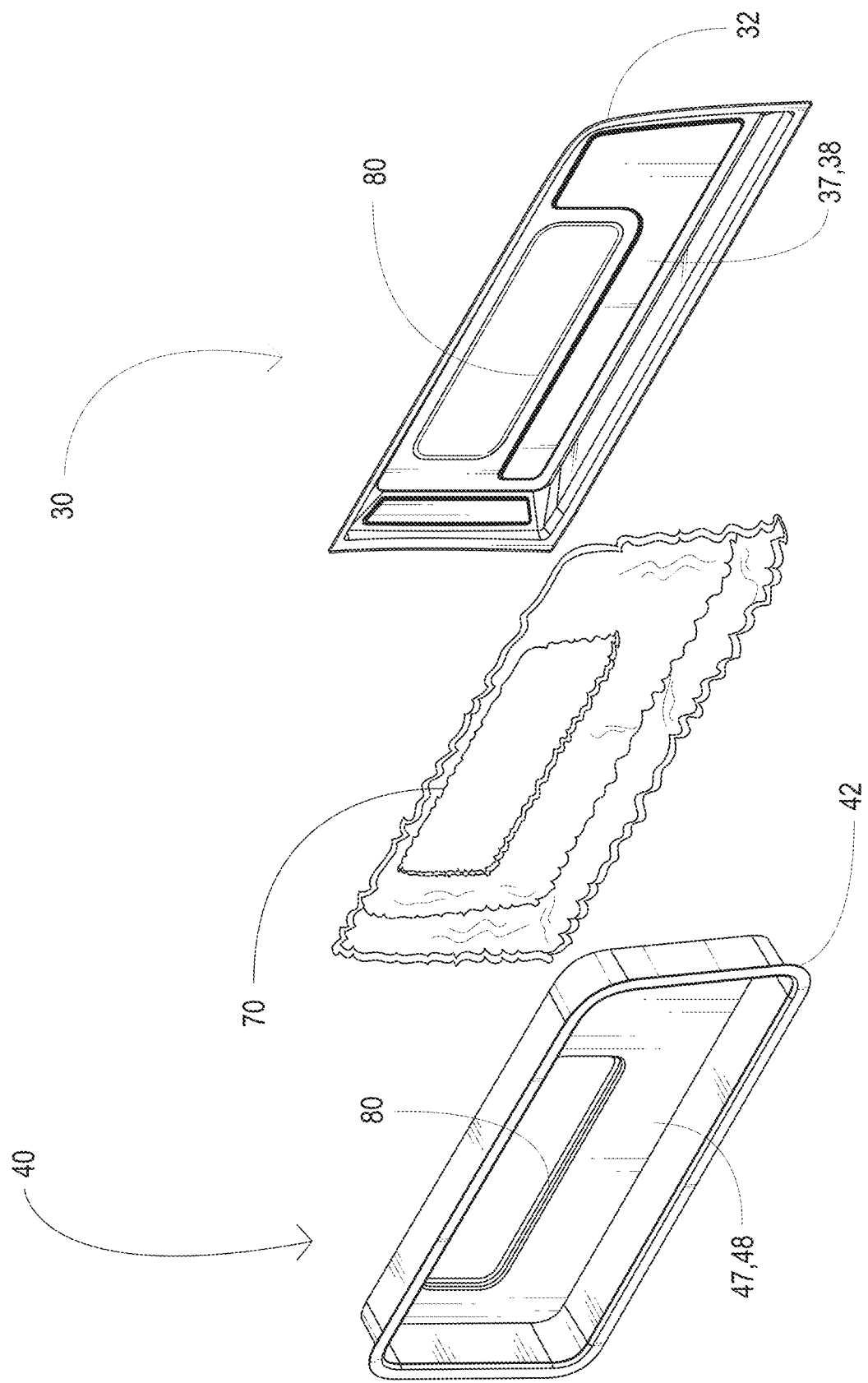
FIG. 4 is an exploded perspective view showing inner surfaces of the inner capsule and the outer capsule.
Figure 5:
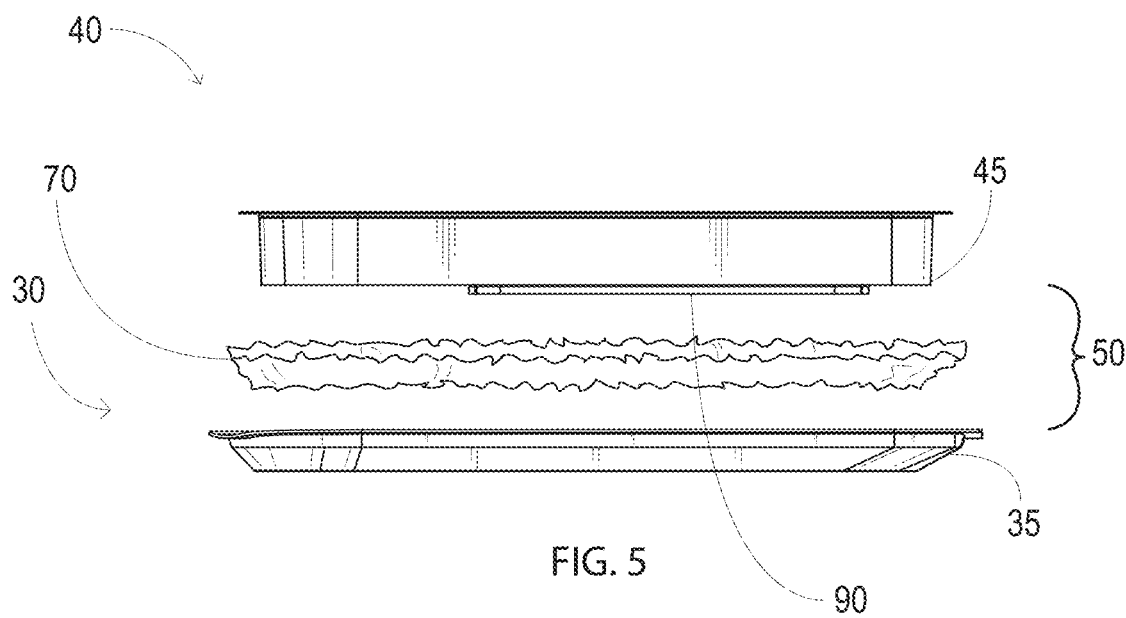
FIG. 5 is an exploded top plan view of the invention, illustrating the outer capsule and the inner capsule nested together when assembled through an extension aperture in the side wall of the vehicle.

FIGS. 1-4 show an extension capsule 10 for use with a vehicle 20 that has at least an inside cargo area 25 and a side wall 26 with an outer surface 27, an inner surface 28, and an extension aperture 29. The extension capsule 10 includes an outer capsule 30 and an inner capsule 40, each having respective back wall panels 38, 48 with inside surfaces 37, 47, outside surfaces 39, 49, and perimeters 36, 46. The outer capsule 30 has at least one peripheral wall 35 projecting forward from the perimeter 36 and terminating at an outwardly-extending lip 32. The at least one peripheral wall 35 may be sloped for added aerodynamic efficiency (FIG. 5).

Similarly, the inner capsule 40 has at least one peripheral wall 45 projecting forward from the perimeter 46 and terminating at a forward outwardly-extending lip 42. The inner capsule 40 is configured to nest at least partially within the outer capsule 30, creating a peripheral wall gap 50 between the peripheral walls of the outer and inner capsules, and a back wall gap 60 between the back walls of the outer and inner capsules. The outwardly-extending lip 32 of the outer capsule 30 contacts the outer surface 27 of the side wall 26 at the extension aperture 29, and the outwardly-extending lip 42 of the inner capsule 40 contacts the inner surface 28 of the side wall 26 at the extension aperture 29. When the inner capsule 40 is nested within the outer capsule 30, and both are disposed through the extension aperture 29 of the vehicle's side wall 26, the inside cargo area 25 is expanded outwardly into the extension capsule 10.

Figure 6:
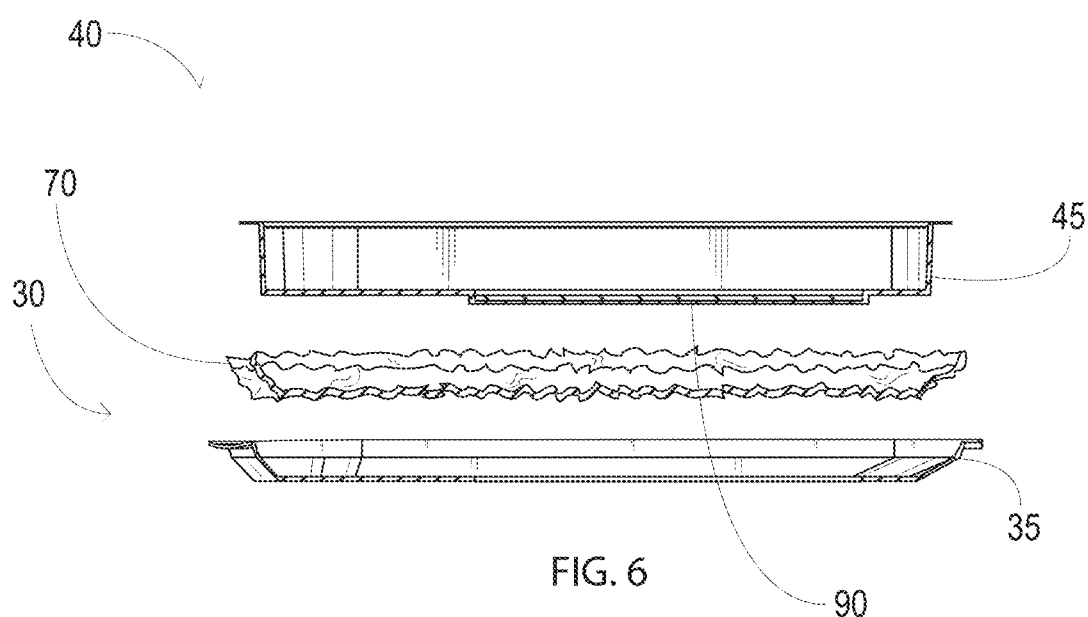
FIG. 6 is a cross-sectional view of the invention as installed in the vehicle, taken along line 6-6 of FIG. 2.

The outer capsule 30 is preferably fixed with the side wall 26 of the vehicle 20 with a window weld type of adhesive at the outwardly-extending lip 32. The inner capsule 40 is preferably fixed with the inner surface 28 of the side wall 26 of the vehicle 20 with either mechanical fasteners such as screws or panel snaps, or a suitable adhesive. Then, to strengthen the extension capsule 10 once installed in the vehicle 20, the outer capsule 30 is fixed with the inner capsule 40 with a backing ring (not shown), adhesive, or other suitable mechanical fasteners. This sandwiches the side wall 26 of the vehicle 20 between the outer capsule 30 and the inner capsule 40 (FIG. 6). This provides the necessary structural integrity that allows such vacuum formed capsules 30,40 to be a viable option on the vehicle 20.

Optionally, an insulation layer 70 (FIGS. 3-6) may be disposed between the inner capsule and the outer capsule 30 to provide thermal insulation to the extended cargo area. This feature enhances the utility of the extension capsule 10 by maintaining a desired temperature within the cargo area. The insulation layer 70 is preferably made with the 3M product sold under the name "Thinsulate" which is a synthetic fiber-based insulation, but other materials could also be used, such as Havelock wool, Arctic Fiber, spray in foam, or even hard composite insulation materials.

In another embodiment, the inner capsule 40 and the outer capsule 30 may each include a mutually aligned window aperture 80. A transparent window 90 is fixed within at least the outer capsule 30 within the window aperture 80. Further, the inner capsule 40 and the outer capsule 30 may be in mutual contact at their respective window apertures 80. This design ensures a seamless look and provides structural support to the extension capsule 10.

Another optional feature includes the window 90 having one fixed window pane 91 and one selectively openable window pane 92. When the openable window pane 92 is placed in an open configuration 100, the inside cargo area is open to the outside of the vehicle 20, allowing for ventilation or the passage of larger items.

The inner capsule 40 and the outer capsule 30 are also preferably formed through a vacuum-forming process, which is a cost-effective method of manufacturing that can produce strong and lightweight components. Additionally, the inner capsule 40 and the outer capsule 30 may be both formed with an ABS plastic material. ABS plastic is known for its strength, rigidity, and impact resistance, making it an ideal material for the extension capsule 10. The inner capsule 40 and the outer capsule 30 thus formed provide a light-weight yet structurally strong extension capsule 10.

While a particular form of the invention has been illustrated and described, it will be apparent that various modifications can be made without departing from the spirit and scope of the invention. For example, the shape of the inner capsule 40 and of the outer capsule 30 may vary from that shown in the drawings, and be circular, oval, or some other suitable shape. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. An extension capsule for use with a vehicle having at least an inside cargo area and a side wall having an outer surface, an inner surface, and an extension aperture, comprising:
    an outer capsule having a back wall panel with an inside surface, an outside surface, and a perimeter, at least one peripheral wall projecting forward from the perimeter of the wall panel and terminating at a forward outwardly-extending lip;
    an inner capsule having a back wall panel with an inside surface, an outside surface, and a perimeter, at least one peripheral wall projecting forward from the perimeter of the wall panel and terminating at a forward outwardly-extending lip, the inner capsule configured for nesting at least partially within the outer capsule and defining a peripheral wall gap between the peripheral walls of the outer capsule and the inner capsule, and defining a back wall gap between the back wall of the outer capsule and the back wall of the inner capsule;
    the outwardly-extending lip of the outer capsule contacting the outer surface of the side wall of the vehicle at the extension aperture, the outwardly-extending lip of the inner capsule contacting the inner surface of the side wall of the vehicle at the extension aperture;
    whereby with the inner capsule nested with the outer capsule, and the inner and outer capsules disposed through the extension aperture of the side wall of the vehicle, the inside cargo area is expanded outwardly into the extension capsule.

2. The extension capsule of claim 1 further including an insulation layer disposed between the inner capsule and the outer capsule.

3. The extension capsule of claim 1 wherein the inner capsule and the outer capsule each further include a mutually aligned window aperture, a transparent window being fixed with at least the outer capsule within the window aperture.

4. The extension capsule of claim 3 wherein the inner capsule and the outer capsule are in mutual contact at their respective window apertures.

5. The extension capsule of claim 3 wherein the window includes one fixed window pane and one selectively openable window pane, whereby when the openable window pane is placed in an open configuration, the inside cargo area is open to outside of the vehicle.

6. The extension capsule of claim 1 wherein the inner capsule and the outer capsule are both formed through a vacuum-forming process.

7. The extension capsule of claim 6 wherein the inner capsule and the outer capsule are both formed with an ABS plastic material.

8. An extension capsule for use with a vehicle, the extension capsule comprising:
    an outer capsule having a back wall panel with an inside surface, an outside surface, and a perimeter, at least one peripheral wall projecting forward from the perimeter of the wall panel and terminating at a forward outwardly-extending lip, the outwardly-extending lip of the outer capsule configured to contact an outer surface of a side wall of the vehicle at an extension aperture;
    an inner capsule having a back wall panel with an inside surface, an outside surface, and a perimeter, at least one peripheral wall projecting forward from the perimeter of the wall panel and terminating at a forward outwardly-extending lip, the inner capsule configured for nesting at least partially within the outer capsule and defining a peripheral wall gap between the peripheral walls of the outer capsule and the inner capsule, and defining a back wall gap between the back wall of the outer capsule and the back wall of the inner capsule, the outwardly-extending lip of the inner capsule configured to contact the inner surface of the side wall of the vehicle at the extension aperture;
    an insulation layer disposed between the inner capsule and the outer capsule;
    mutually aligned window apertures in the inner capsule and the outer capsule, a transparent window being fixed within at least the outer capsule within the window aperture, wherein the window includes one fixed window pane and one selectively openable window pane, whereby when the openable window pane is placed in an open configuration, an inside cargo area is open to the outside of the vehicle;
    wherein the inner capsule and the outer capsule are both formed through a vacuum-forming process and are both formed with an ABS plastic material;
    whereby with the inner capsule nested with the outer capsule, and the inner and outer capsules disposed through the extension aperture of the side wall of the vehicle, the inside cargo area is expanded outwardly into the extension capsule.

* * * * *